United States Patent [19]

Trinkley

[11] Patent Number: 4,611,532
[45] Date of Patent: Sep. 16, 1986

[54] FOOD PEELER

[76] Inventor: Kim W. Trinkley, 51393 Simmons, South Bend, Ind. 46637

[21] Appl. No.: 542,142

[22] Filed: Oct. 14, 1983

Related U.S. Application Data

[63] Continuation of Ser. No. 372,031, Apr. 26, 1982, abandoned.

[51] Int. Cl.[4] .............................................. A23N 7/00
[52] U.S. Cl. ...................................... 99/628; 99/623; 198/659
[58] Field of Search ................... 99/584, 585, 539, 540, 99/623-629; 15/3.17, 3.2, 3.21; 198/659

[56] References Cited

U.S. PATENT DOCUMENTS

| | | | |
|---|---|---|---|
| 2,627,140 | 2/1953 | Marzolf | 15/3.2 X |
| 3,360,108 | 12/1967 | Voss | 198/659 |
| 3,967,722 | 7/1976 | Dietart | 198/659 |
| 4,192,418 | 3/1980 | Montgomery | 198/659 |
| 4,258,069 | 3/1981 | Amstad | 99/626 X |

Primary Examiner—Timothy F. Simone
Attorney, Agent, or Firm—James D. Hall

[57] ABSTRACT

A food peeler which includes an auger having a flexible blade for urging food items transversely across an endless belt which carries the food items. The auger blade has multiple protrusions formed on its surface for abrasively contacting the food items.

2 Claims, 4 Drawing Figures

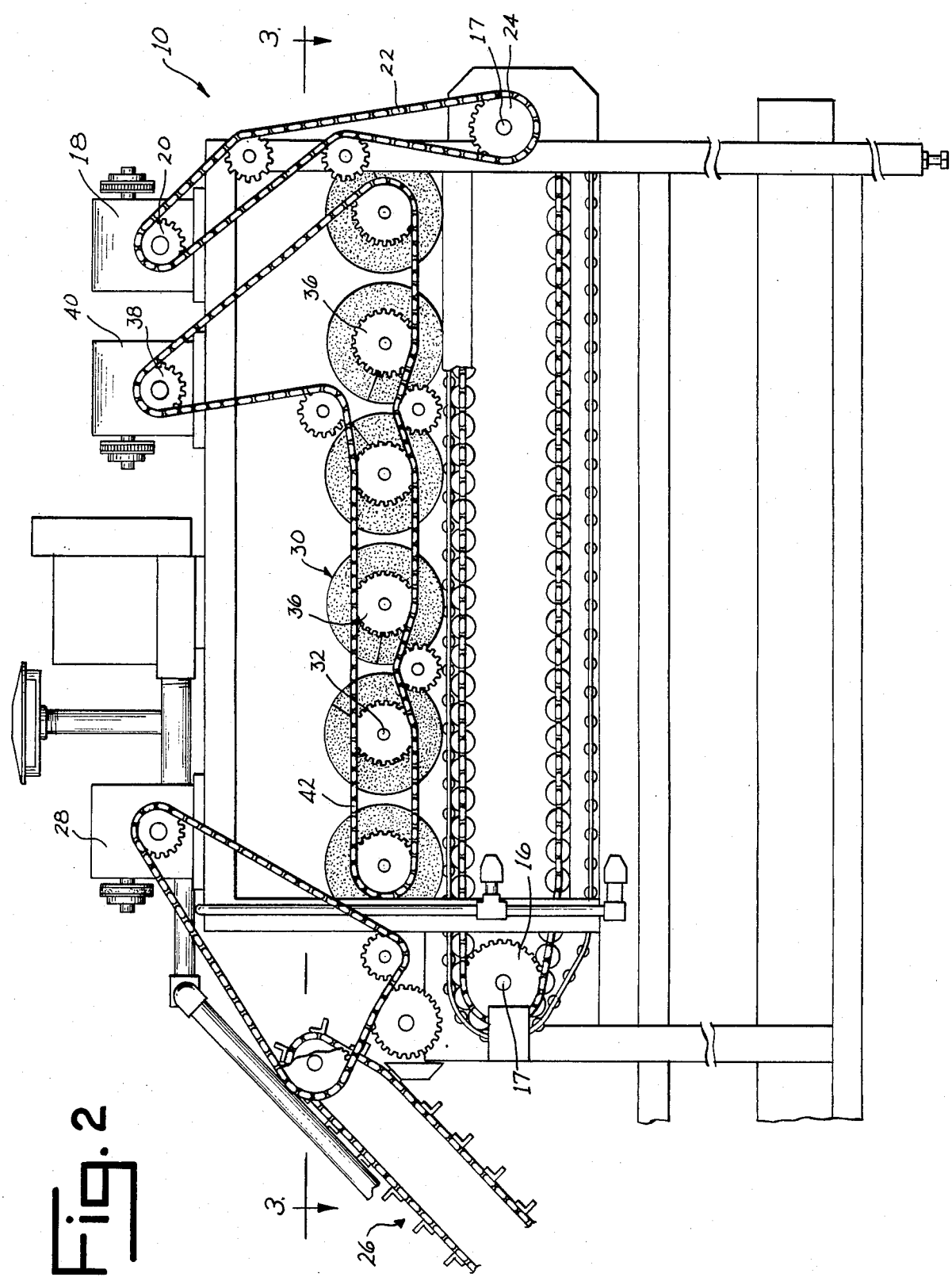

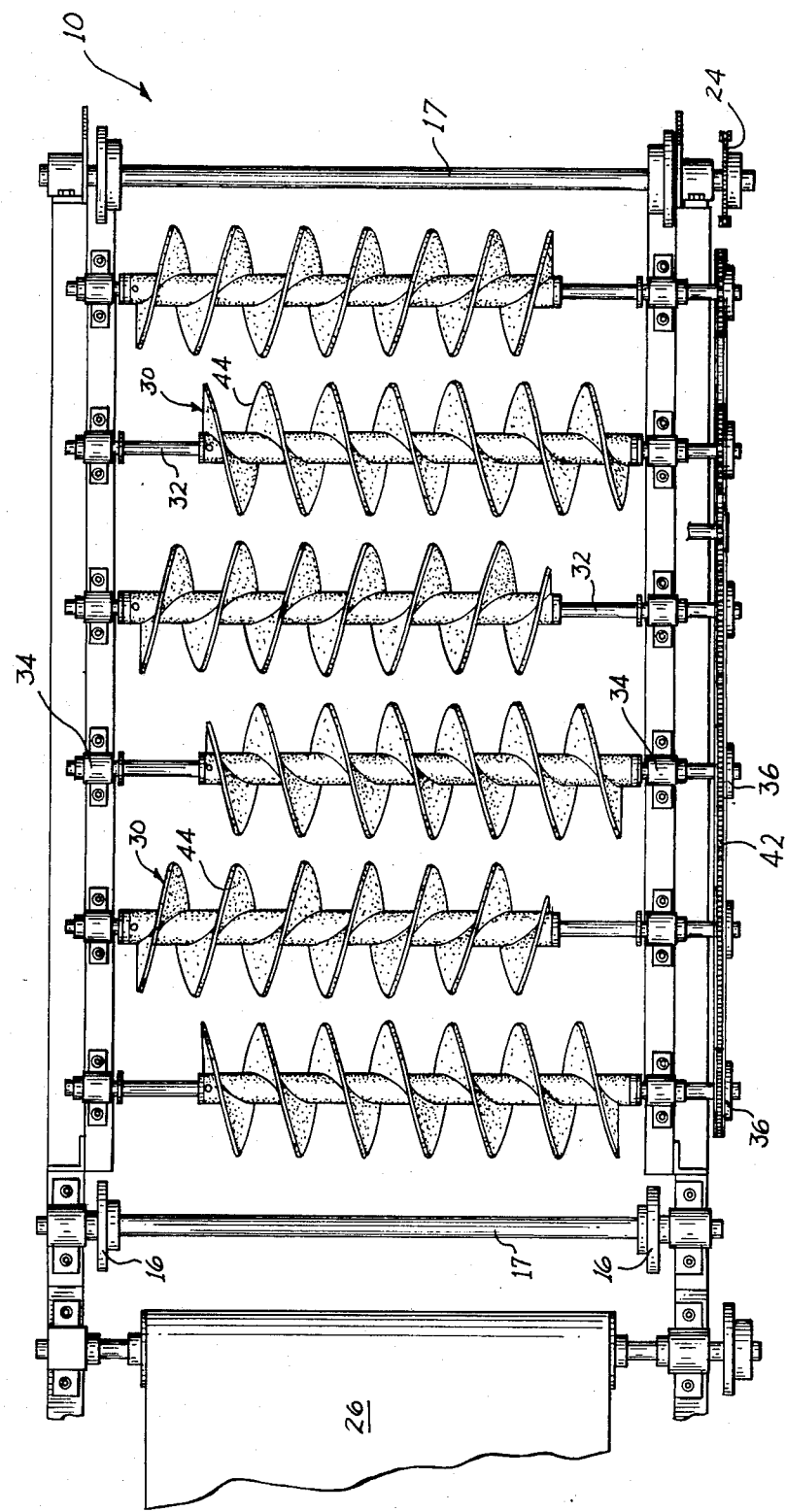

FOOD PEELER

This is a continuation of application Ser. No. 372,031, filed Apr. 26, 1982, now abandoned.

SUMMARY OF THE INVENTION

Heretofore, devices for removing peelings from food items have included a continuous belt which conveys the food items across the device. Brushes are arranged in a spiral pattern transverse the belt and make contact with the food items as they are carried upon the belt. The brushes in contacting the food items cause their outer surfaces or peelings to be removed. In this invention, flexible augers are substituted for the spiral brushes. The surfaces of the blades have protrusions which abrasively contact the food items to remove their peelings.

Accordingly, it is an object of this invention to provide a food peeler which includes an auger having a flexible blade for removing the peelings from food items, such as fruits and vegetables.

Another object of this invention is to provide a peeler which is for food items such as fruits and vegetables and which is of efficient dependable operation.

Another object of this invention is to provide an auger having a flexible spiral blade.

Other objects of this invention will become apparent upon a reading of the following description.

A BRIEF DESCRIPTION OF THE DRAWINGS

FIG. 2 is a sectional view of the peeling device taken generally along line 2—2 of FIG. 1.

FIG. 3 is a sectional view of the peeling device taken along line 3—3 of FIG. 2.

DESCRIPTION OF THE PREFERRED EMBODIMENT

Figure 1:
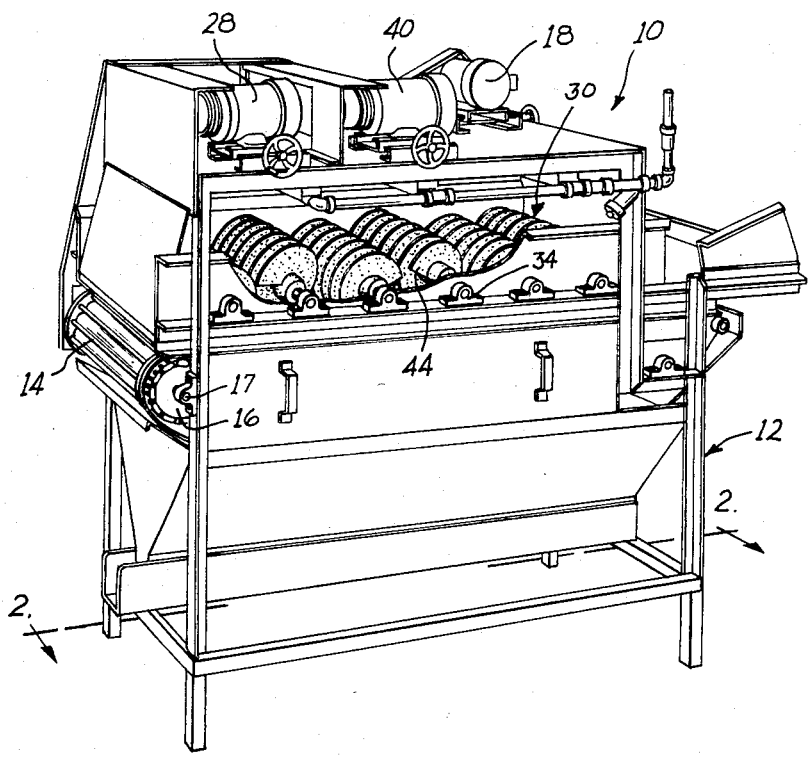
FIG. 1 is a perspective view of a device for removing peelings from food items having the augers of this invention used therein.
Figure 4:
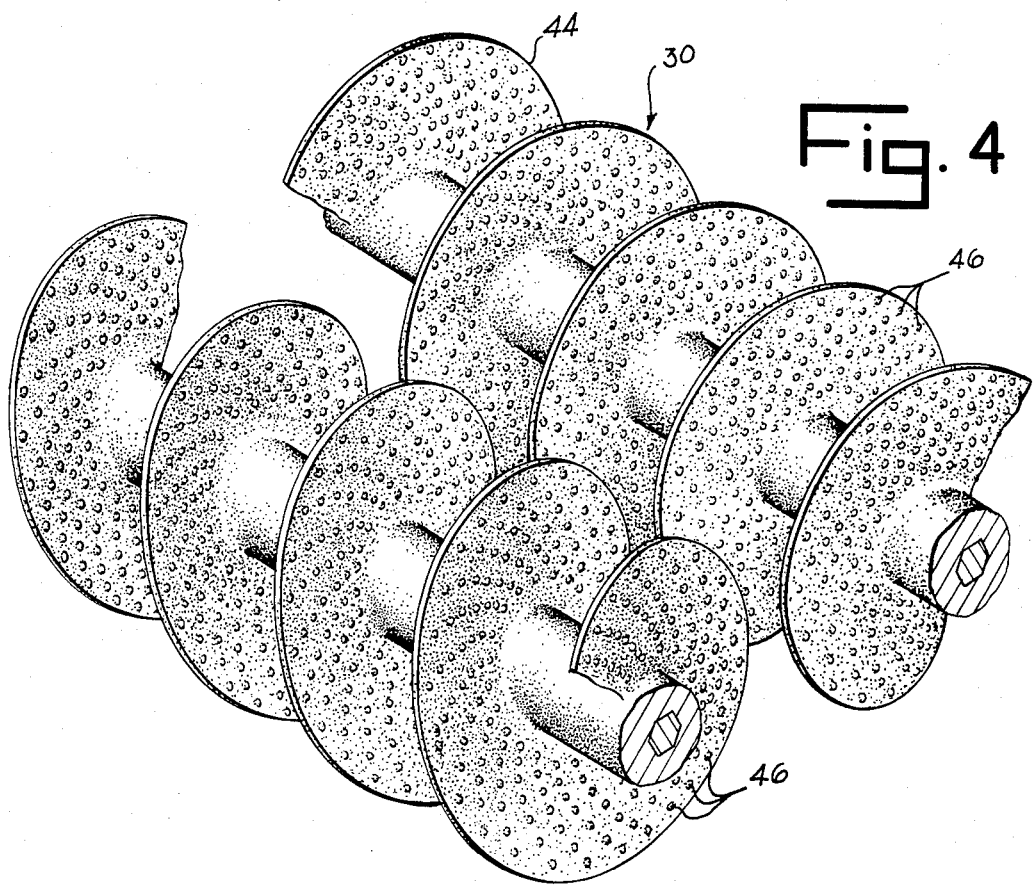
FIG. 4 is a fragmentary perspective view of a pair of augers of this invention.

The preferred embodiment illustrated is not intended to be exhaustive or to limit the invention to the precise form disclosed. It is chosen and described in order to explain the principles of the invention and its application and practical use to thereby enable others skilled in the art to utilize the invention.

Peeling device 10 includes a frame 12. An endless belt 14, which preferably includes inner and outer belt sections, is carried by sprockets 16 mounted on shafts 17 at each end of frame 12. Belt 14 is driven by a motor 18. A sprocket 20 is carried upon the drive shaft of motor 18 and is connected by a chain 22 to a sprocket 24 mounted on one of the shafts 17. The food items such as tomatoes or peaches are carried to belt 14 by a feed conveyor 26 which deposits the food items at one end of the belt. Conveyor 26 is chain driven by a motor 28.

The invention herein relates to auger 30 having shafts 32 which extend transversely of belt 14 and which are journaled at their ends in bearings 34 connected to frame 12. Shafts 32 carry sprockets 36 at corresponding ends. Sprockets 36 are joined by a chain 42 to a drive sprocket 38 connected to the shaft of a motor 40. Actuation of motor 40 causes rotation of augers 30. Each auger 30 includes a flexible, spiraling blade 44 which may be formed from a rubber material. Auger blades 44 are carried adjacent to and above belt 14 with the blades of adjacent augers 30 having opposite twists. The surface of each auger blade 44 includes a number of protrusions 46 which give the surface an abrasive quality.

In use, the food items are conveyed by belt 14 longitudinally of frame 12. The twist in blades 44 exerts a resistance force transverse to the motion of the food items upon belt 14 so as to urge protrusions 46 into frictional contact with the food items to cause removal of the skins or peelings. As the food items come into contact with auger blades 44, they are shifted transversely relative to the direction of travel of belt 14 as they are carried through the auger blades to the discharge end of the belt.

It is to be understood that the invention is not to be limited by the above description but may be modified within the scope of the appended claims.

What I claim is:

1. In a peeling remover for food items such as fruits and vegetables, said remover including a frame, an endless belt means for conveying said food items longitudinally across said frame, twisting means journaled in said frame and extending transversely of said belt means for abrasively contacting said food items being conveyed upon said belt means and urging the food items transversely over the belt means, the improvement wherein said twisting means includes a spiral blade located adjacently above said belt means for receiving said food items between the turns of said blades, said blade having abrasive food item contacting surfaces and being flexible to provide yieldable resistance for said food items, a plurality of said twisting means spaced longitudinally along said belt means, each twisting means having its blade turn oppositely from the blade of the adjacent twisting means.

2. The peeling remover of claim 1 wherein said blade surfaces include multiple protrusions.

* * * * *